April 30, 1963     H. C. GLITSCH     3,087,711
FLUID CONTACT TRAYS
Filed Nov. 21, 1960     3 Sheets-Sheet 1
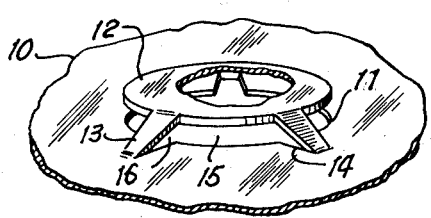
Fig. 1
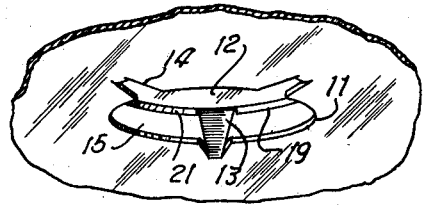
Fig. 2
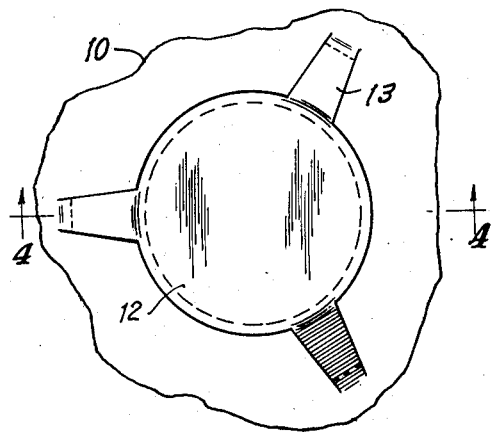
Fig. 3
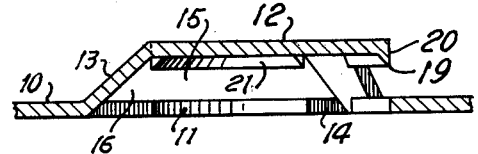
Fig. 4
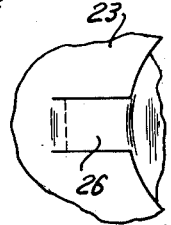
Fig. 8
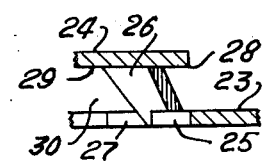
Fig. 9
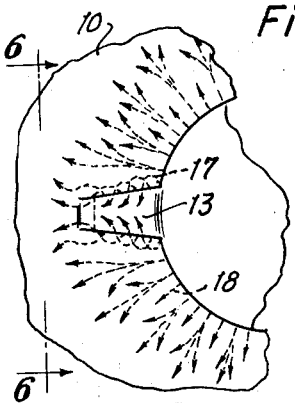
Fig. 5
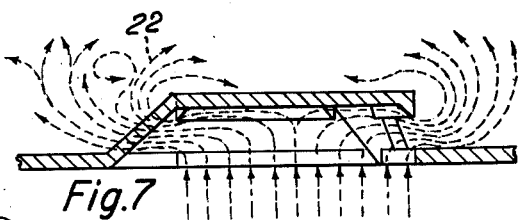
Fig. 7     Fig. 11
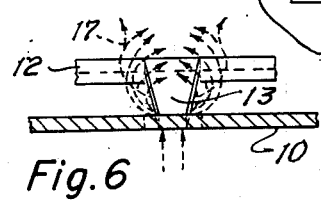
Fig. 10
Fig. 6
INVENTOR
Hans C. Glitsch
BY
ATTORNEYS April 30, 1963 H. C. GLITSCH 3,087,711
FLUID CONTACT TRAYS Filed Nov. 21, 1960 3 Sheets-Sheet 2

INVENTOR
Hans C. Glitsch
BY Ehley & Ehley
ATTORNEYS

April 30, 1963 H. C. GLITSCH 3,087,711
FLUID CONTACT TRAYS

Filed Nov. 21, 1960 3 Sheets-Sheet 3

INVENTOR
Hans C. Glitsch

BY *Shley & Shley*

ATTORNEYS

United States Patent Office 3,087,711
Patented Apr. 30, 1963

3,087,711
FLUID CONTACT TRAYS
Hans C. Glitsch, Dallas, Tex., assignor to Fritz W. Glitsch & Sons, Inc., Dallas, Tex., a corporation of Delaware
Filed Nov. 21, 1960, Ser. No. 70,789
14 Claims. (Cl. 261—114)

This invention relates to new and useful improvements in fluid contact trays.

One object of the invention is to provide an improved fluid contact tray having novel means of economical construction for controlling flow through its vapor orifices.

A primary object of the invention is to provide an improved fluid contact tray wherein the means for controlling flow through its vapor orifices is made integral with the tray and is formed by shearing said tray to produce the orifices so as to eliminate the necessity of separately forming and attaching said control means.

An important object of the invention is to provide an improved fluid contact tray having flow control members overlying its vapor orifice and attached to the trays by inclined legs, the inclined legs having their outer ends spaced from their orifice to provide apertures between the tray and the margin of said legs for directing fluid laterally through the liquid at an angle to the fluid discharged by the flow passage so as to collide therewith and increase the turbulence of the fluid and liquid and cause more intimate contact and thorough mixing of said fluid and liquid.

Another object of the invention is to provide an improved fluid contact tray, of the character described, wherein the openings are formed by shearing the legs from the tray so as to space said legs from the vapor orifices and create flow passages which substantially surround said orifices and permit more uniform distribution of the ascending fluid, the areas of the passages being enlarged by said openings.

A particular object of the invention is to provide an improved fluid contact tray, of the character described, wherein the flow control means may include elements for coacting with the members to meter the flow through the vapor orifices in accordance with the pressure differential above and below the tray so as to maintain uniform optimum velocity of the fluid at its points of contact or mixing with the liquid on said tray without creating excessive pressure drop.

An object of the invention is to provide an improved fluid contact tray, of the character described, wherein the metering elements are in the form of caps overlying and loosely confined on the flow control members for upward and downward movement in accordance with the pressure differential above and below the tray, the lower portions of the caps extending between said members and the tray to vary the areas of the flow passages and the rates of flow whereby greater operating efficiency is obtained at extremely low as well as high rates of vapor flow without impairing the turbulent action resulting from the openings which underlie the legs of said members.

A further object of the invention is to provide an improved fluid contact tray, of the character described, wherein the flow control means may include closures loosely confined by the members in overlying relation to the vapor orifices to permit selected initial rates of flow and movable upwardly to permit greater or desired maximum rates of flow whereby greater operating efficiency is obtained at extremely low as well as high rates of vapor flow without impairing the turbulent action resulting from the openings which underlie the legs of said members.

Another object of the invention is to provide an improved fluid contact tray, of the character described, wherein a metering action may be imparted to the closures by forming openings of predetermined areas therein and wherein the metering characteristics of the caps may be varied by forming openings of predetermined areas in the flow control members.

An object of the invention is to provide an improved fluid contact tray, of the character described, wherein the flow control members or closures may have depending perimeters for creating a vena contracta at the vapor-liquid interface so as to enlarge the area of said interface and cause extreme turbulence and prolonged contact and thorough mixing of the vapor and liquid.

A contruction designed to carry out the invention will be hereinafter described, together with other features of the invention.

The invention will be more readily understood from a reading of the following specification and by reference to the accompanying drawings, wherein examples of the invention are shown, and wherein:

FIG. 1 is a perspective view, partly in section, of a portion of a fluid contact tray constructed in accordance with the invention and showing one of its vapor orifices and the means for controlling flow therethrough.

FIG. 2 is an underside view similar to FIG. 1,

FIG. 3 is a top plan view of the flow control means,

Figure 12:
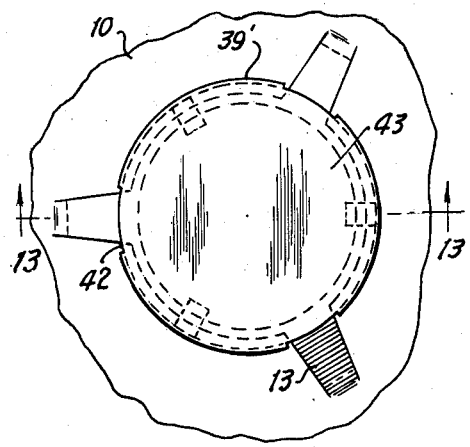
Figure 13:
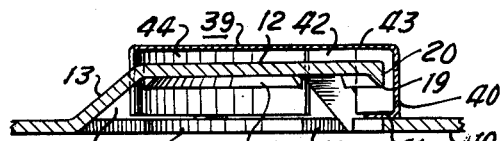
Figure 14:
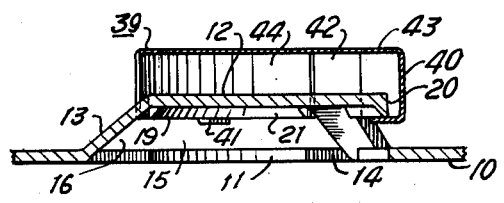
Figure 15:
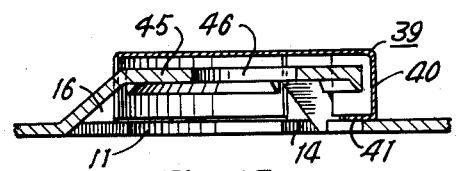
Figure 16:
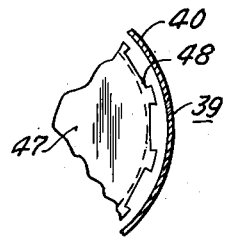
Figure 18:
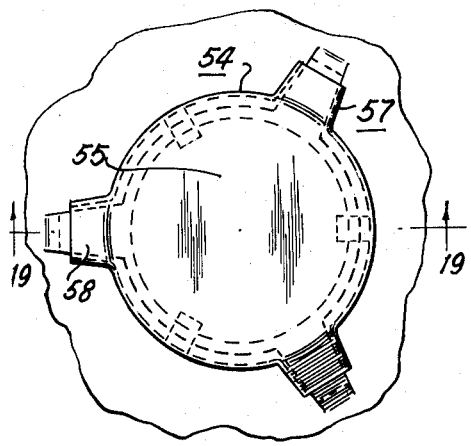
Figure 17:
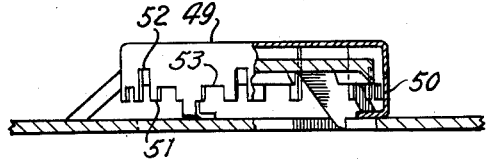
Figure 19:
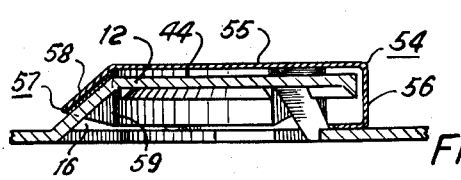
Figure 20:
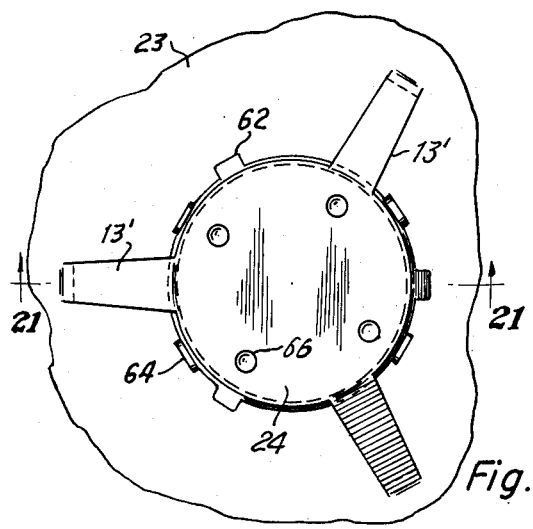
Figure 25:
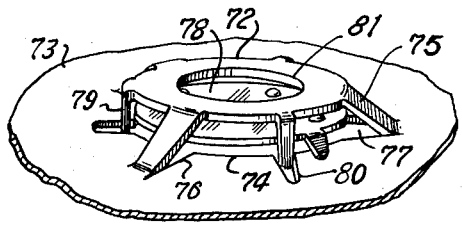
Figure 21:
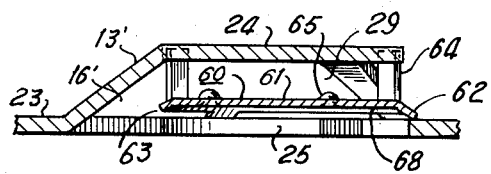
Figure 26:
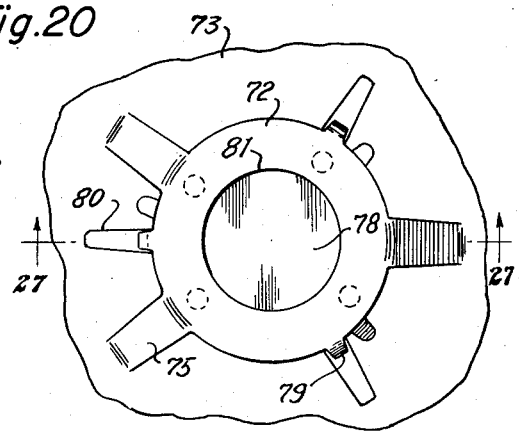
Figure 22:
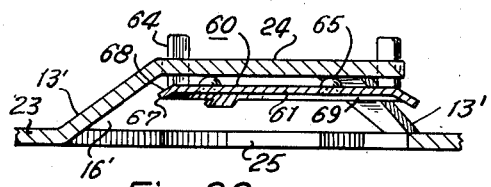
Figure 27:
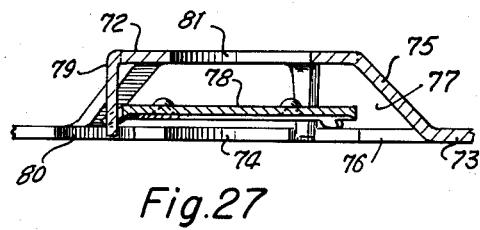
Figure 23:
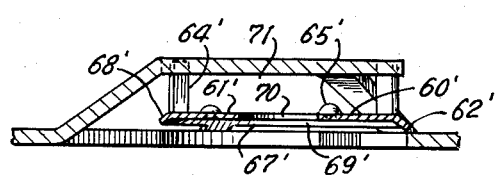
Figure 24:
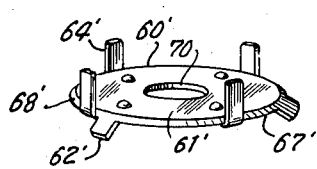

FIG. 4 is a transverse, vertical sectional view, taken on the line 4—4 of FIG. 3, FIG. 5 is a top plan view showing the flow of the vapor through the controlled orifice, FIG. 6 is a transverse, vertical, sectional view, taken on the line 6—6 of FIG. 5, FIG. 7 is a transverse, vertical, sectional view showing the vapor flow, FIG. 8 is a top plan view of a portion of slightly modified flow control means, FIG. 9 is a transverse, vertical, sectional view of a portion of the modified control means, FIG. 10 is a plan view of modified flow control means, FIG. 11 is a transverse, vertical, sectional view, taken on the line 11—11 of FIG. 10, FIG. 12 is a top plan view of a portion of a tray having modified flow control means, FIG. 13 is a transverse, vertical, sectional view, taken on the line 13—13 of FIG. 10, showing the metering element of the modified control in its initial position, FIG. 14 is a view, similar to FIG. 13, showing the metering element in its fully opened position, FIG. 15 is a view, similar to FIG. 13, of another modified control means, FIG. 16 is a top plan view of a portion of further modified control means, FIG. 17 is a transverse, vertical, sectional view, partly in elevation, showing a modified metering element, FIG. 18 is a top plan view of modified flow control means, FIG. 19 is a transverse, vertical, sectional view, taken on the line 19—19 of FIG. 18, FIG. 20 is a top plan view of flow control means having a closure, FIG. 21 is a transverse, vertical, sectional view, taken on the line 21—21 of FIG. 20, showing the closure in its initial position, FIG. 22 is a view, similar to FIG. 21, showing the closure in its fully opened position, FIG. 23 is a view, similar to FIG. 21, showing a modified closure, FIG. 24 is a perspective view of the modified closure, FIG. 25 is a perspective view of another modified flow control means having a closure, FIG. 26 is a top plan view of the flow control means shown in FIG. 25, and FIG. 27 is a transverse, vertical, sectional view, taken on the line 27—27 of FIG. 26.

In the drawings, the numeral 10 designates one of the superimposed decks or trays which extend transversely across the interior of a tower or vessel (not shown) of the type used in petroleum and chemical processes, such as fractionation, absorption and distillation, wherein gas or vapor and liquids or liquids and liquids are contacted for separation, recovery, refinement or purification. A desired level of liquid is maintained on each tray for contact with ascending gas, vapor or other fluid. The tray 10 has a multiplicity of openings, ports or orifices 11 to accommodate the upward flow of fluid into contact with the liquid on said tray. Usually, each orifice is circular, but may be of any desired contour and may vary in size. Flow control means, in the form of a circular member or plate 12, overlies each orifice below the liquid level for directing the ascending fluid laterally to insure intimate contact and thorough mixing thereof with the liquid.

Each plate 12 is relatively-thin and complementary to its orifice 11, being formed by shearing the tray 10 to produce the orifice. A plurality of inclined members or legs 13 integrally connect the perimeter of the plate to the tray and are sheared from said tray so as to provide openings or slots 14 which underlie and which are complementary to the legs. Preferably, the legs 13 extend radially from the plate and the inclination of said legs is between 25 and 45 degrees which is within the allowable limits of elongation or stretch of metals normally used in fluid contact trays. Most of these metals will tolerate an elongation of 25 to 35 percent without excessive work hardening or danger of rupturing the metal during the stretching thereof. As shown in FIGS. 1–4, it is desirable for the legs to taper or decrease in width outwardly so as to distribute the stretch during the shearing and forming operation and insure more uniform elongation throughout the entire length of said legs due to the change in their cross-sectional shape.

Although complementary in shape, the legs 13 are of greater length than the openings 14 to dispose the plate 12 in spaced relation to the orifice 11. This spacing provides a flow passage 15 between the margins of the orifice and plate which, preferably, is approximately one-half the area of said orifice so as to minimize parasitic pressure drop and loss of velocity of the fluid until it reaches the vapor-liquid interface. Each opening 14, which communicates with and enlarges the area of the orifice, coacts with its overlying leg to form a substantially triangular aperture or port 16 on each side of the leg for directing fluid at a tangent or at substantially a right angle to the fluid discharged by the passage 15. It is noted that the vapor flow through the two apertures 16 adjacent each leg 13 is directed into the liquid by the inclined baffle provided by each leg. As shown by the broken lines 17 and 18 in FIGS. 5 and 6, the tangential streams of fluid flowing from the apertures 16 collide with the radial stream of fluid flowing from the passage and cause agitation or turbulence of the fluid and liquid. This turbulent action is more pronounced adjacent the legs and imparts a boiling or swirling movement to the fluid 17 emitted by the apertures whereby said fluid is directed in circular paths around and over said legs (FIG. 6). Due to this action, vapor-liquid contact is provided throughout the entire perimeter of the orifice irrespective of the number of legs of its plate.

As shown most clearly in FIGS. 4 and 7, the plate 12 has a sharp edge 19 at the underside of its perimeter to provide a vena contracta at the vapor-liquid interface for increasing the area of the interface and turbulence of the fluid and liquid so as to more intimately contact and thoroughly mix the same. The contour of the topside of the plate is immaterial and, as shown, may be parallel to the underside of said plate. For amplifying the vena contracta of the vapor-liquid interface, the perimeter of the plate has a depending edge portion or lip 20 which constricts the flow passage 15 and which is provided by the forming or drawing of said perimeter downwardly whereby said lip has an outwardly and downwardly inclined inner surface 21. The perimetrical lip 20, which is continuous except for the legs 13, imparts centripetal force to the fluid and creates a "fantail" effect, as shown by the broken lines 22 in FIG. 7, which further increases the area of the vapor-liquid interface and causes additional turbulence and prolonged contact and thorough mixing of the fluid and liquid. It is noted that the inclined surface 21 directs the fluid downwardly toward the tray so as to elongate its lateral travel through the liquid on said tray.

A portion of a deck or tray 23 having a modified flow control member or plate 24 sheared therefrom for overlying its vapor orifice 25 is shown in FIGS. 8 and 9. The plate 24 is integrally connected to the tray 23 by a plurality of legs 26 which are similar to the legs 13 but which have parallel longitudinal margins so as to be of the same width throughout their lengths. As a result, the openings or slots 27, formed by the shearing of the legs 26 from the tray, have parallel sides. Although the modified plate has a sharp edge 28 at the underside of its perimeter, the depending edge portion or lip is omitted whereby the entire area of said underside is in a common plane. With these exceptions, the plate 24 is identical to the plate 12 and is spaced from the orifice 25 whereby a flow passage 29, similar to the passage 15, is provided between the margins of said plate and orifice. As shown by the numeral 30, a substantially triangular aperture or port is formed on each side of each inclined leg for directing ascending fluid at a tangent or at approximately a ring angle to the fluid discharged by the passage 29, in substantially the same manner as the apertures 16, so as to provide the turbulent action shown in FIGS. 5 and 6. In many instances, the vena contracta provided by the sharp edge 28 is sufficient and the depending edge portion or lip is unnecessary.

As noted, the orifices and flow control members or plates may be of any desired shape. A portion of a deck or tray 31, having rectangular orifices 32 and overlying, complementary flow control plates 33, is shown in FIGS. 10 and 11. Since the number of legs is subject to variation, four inclined legs 34 may be sheared from the tray 31 to integrally connect each plate 33 thereto and provide underlying openings or slots 35 in communication with the orifice 32 as well as substantially triangular apertures or ports 36, similar to the apertures 16 and 30. The plate 33 is substantially identical to the plate 12 and has a similar depending edge portion or lip 37 for creating an amplified vena contracta. It is pointed out that the flow control plates need not be parallel to the trays. If it is desired to impart a predetermined directional flow to the liquid on the tray, the plates may be inclined relative to the trays as shown in FIG. 11. In such construction, the legs 34 are of different lengths and the flow passage 38 between the margins of the orifice 32 and plate 33 is of varying width.

Frequently, it is advantageous to meter the flow through the orifices of the tray so as to delay the opening thereof in order to permit the maintenance of uniform optimum velocity of the ascending fluid in accordance with the pressure differential above and below the tray. In FIGS. 12–14, a complementary metering element or cap 39 is shown mounted on the flow control member or plate 12 for coacting therewith. The cap 39 is of slightly greater dimension or diameter than the plate so as to be freely movable relative thereto and has a depending perimetrical edge portion or skirt 40. A plurality of inwardly-directed ears or lugs 41 are formed on the lower margin of the skirt 40 in underlying relation to the cap so as to limit upward movement of said cap and prevent its detachment from the plate 12 by engaging the underside of said plate (FIG. 14). Openings or slots 42 are forced in the skirt 40 to accommodate the legs 13 and coact therewith to confine the cap against rotation. The cap has a top 43, which may be flat, in overlying, spaced relation to the plate so as to provide a space 44 therebetween. It is noted that this spaced relationship may be provided by the lugs 41 or by dimples or projections in the plate or cap top.

When the cap 39 is in its lowermost position, limited flow of the fluid is permitted through the openings 14 of the tray and the apertures 16 adjacent the legs 13 as well as beneath the skirt 40 so as to enter the liquid on the tray. The kinetic energy and pressure of the fluid impinges the underside of the plate 12 which shields the cap; however, said fluid flows around said plate into the space 44. Upon an increase in pressure and an attendant increase in velocity of the ascending fluid, the pressure of the fluid in the space 44 gradually builds up. When the pressure within this space becomes sufficient, the cap floats upwardly until its lugs 41 strike the underside of the plate. As the cap is lifted by the differential pressure in the space 44, the volume of said space is enlarged as is the area of the flow passage 15 between the margins of the plate and its orifice 11. Consequently, the pressure in the space must be maintained by increased flow in order for upward movement of the cap to continue. If this pressure is maintained and does not increase, the cap floats in an intermediate position between its uppermost and lowermost positions and its elevation fluctuates in accordance with increases and decreases in the pressure of the ascending fluid and the pressure in the space 44. This floating action is due to a portion of the fluid being confined in the space 44 by the skirt of the cap and the shielding of said cap by the plate from the kinetic energy of the fluid. Although it may do so, usually, the cap does not move in a continuous manner between its uppermost and lowermost positions. Instead, the cap rises and falls intermittently or in steps as the fluid flow rate changes.

If desired, the metering cap 39 may be exposed to a percentage of the kinetic energy of the ascending fluid in order to vary the sensitivity of movement of said cap. A flow control member or plate 45, substantially identical to the plate 12, is provided with an opening 46 of predetermined size (FIG. 15) to permit a portion of the fluid to impinge the top 43 of the cap whereby said cap is lifted in a more continuous movement and more quickly reaches its uppermost position. Also, the downward movement of the cap is less gradual with the result that the fluctuation and metering action of said cap is less pronounced. Of course, the metering action of the cap increases with reduction in the size of the opening 46 and decreases upon enlargement of said opening.

Another modified flow control member or plate 47 is shown in FIG. 16 and has a plurality of openings 48 in its perimetrical portion to permit a greater flow of ascending fluid around the plate into the space between said plate and its overlying metering cap 39. Due to this greater flow of fluid between the perimeter of the plate 47 and the skirt 40 of the cap, less time is required to build up the pressure in the space 44 (FIGS. 13 and 14) sufficiently to lift said cap and a smaller volume of flow is necessary to maintain said cap in an elevated position. It is noted that the perimetrical openings 48 do not appreciably expose the cap to the kinetic energy of the fluid, and that the number and/or size of said openings controls the volume of flow into the space 44.

FIG. 17 illustrates a modified metering cap 49 for permitting a greater flow of ascending fluid when the cap is in its lowermost position. As shown by the numeral 50, the skirt of the cap 49 may have openings or slots to accommodate lateral flow in addition to the flow through the openings 14, apertures 16 and beneath said skirt. For the same purpose, the skirt may be spaced an appreciable distance above the tray as shown at 51 and/or may have openings 52 or 53 of various size therein. When a greater initial flow is permitted, it is readily apparent that a greater pressure differential is required to build up pressure in the space 44 sufficiently to lift the metering cap.

It is sometimes desirable to alter the turbulent action produced by the tangential flow of the ascending fluid through the substantially triangular apertures 16 by a modified metering cap 54. As shown in FIGS. 18 and 19, the modified cap is similar to the cap 39 and has a similar top 55. A perimetrical skirt 56 depends from the top and hoods or shrouds 57 are formed therein for substantially enclosing the legs 13. Each shroud 57 is complementary to its leg and has a downwardly-inclined upper portion 58 extending radially from the cap top 55 for overlying the leg and connected to the skirt 56 by upright lateral portions 59. The shrouds terminate above the lower ends of the legs so as to be spaced from the tray and permit limited flow around the lower margins thereof, whereby the flow through the apertures 16 is restricted when the cap 54 is in its lowermost as well as intermediate positions. Due to this restriction of flow, the shrouds 57 also function to direct a greater portion of the fluid into the space 44 for acceleraing the build-up of pressure therein and thereby cause more rapid upward movement of the modified cap.

Although the metering caps 39, 49 and 54 limit flow through the orifice in their lowermost positions, it is frequently necessary to provide a more complete closure for said orifice for controlling minimum flow rates in accordance with the pressure differential across the tray so as to insure intimate contact and thorough mixing of the ascending fluid with the liquid on said tray. As shown in FIGS. 20–22, a freely movable cover or valve element 60 underlies the flow control member or plate 24 of the tray 23 and includes a relatively-thin, substantially flat disk or plate 62 complementary to the orifice 25 for directing the fluid laterally through said liquid. A plurality of lugs or projections 62 depend from the perimeter of the disk 61 for engagement with the topside of the tray to space said disk any desired distance above the orifice and provide an initial flow passage 63 for the fluid ascending through said orifice (FIG. 21). The depending projections 62 determine the initial area of the passage 63 and permit accurate adjustment of said initial area, by being capable of being bent upwardly or downwardly, as well as prevent sticking of the valve disk 61 due to surface tension, rusting or corrosion. Upward movement of the valve element 60 is limited by the plate 24 and a plurality of guide legs or members 64 upstand from the perimeter of the disk adjacent the perimeter of said plate to prevent lateral displacement of said disk and limit rotational movement thereof. In order to minimize surface tension or other adherence of the disk to the plate, projections or dimples 65 may be formed on said disk (FIGS. 21 and 22) or on said plate as shown at 66 in FIG. 20.

The disk 61 may have a sharp edge 67 at the underside of its perimeter, a depending perimetrical edge portion or lip 68 and a downwardly and outwardly inclined perimetrical surface 69, identical to the sharp edge 19, edge portion 20 and surface 21 of the control plate 12, to provide the amplified vena contracta and increase the turbulent action of the fluid as described hereinbefore. Since the valve element 60 is exposed to the kinetic energy of the ascending fluid, it moves to the fully opened position shown in FIG. 22 when the pressure of said fluid becomes sufficient to lift said element. Due to this construction of the valve element, greater operating efficiency is obtained at extremely low as well as high rates of fluid flow and in both the initially opened and fully opened positions of said element. The sharp edge 67 is formed by stamping the disk from a flat sheet, while the depending edge portion 68 and inclined surface 69 may be provided by bending the perimeter of said disk downwardly. Except for the enlargement of the flow passage 63 by the lifting of the valve element, the structure shown in FIGS. 20–22 functions in the same manner as the control plate 12 and provides substantially the same turbulent action shown in FIGS. 5–7. It is noted that tapered legs 13′, similar to the legs 13, have been substituted for the legs 26 whereby the apertures 16′ adjacent said legs 13′ are similar to the apertures 16 rather than the apertures 30.

If desired, the effect of the kinetic energy of the ascending fluid on the valve element may be reduced and a metering action, similar to that provided by the construction shown in FIG. 15, may be obtained. As shown in FIGS. 23 and 24, a modified valve element 60′ is substituted for the valve element 60 and has an opening 70 of selected size in its disk 61′ to permit a portion of the fluid to impinge the underside of the control plate 24. This fluid enters the space 71 between the plate and disk and creates a pressure therein which resists lifting of the disk by the ascending fluid. As a result, the modified valve element tends to float and its elevation fluctuates between its uppermost and lowermost positions. Since the valve element 60′ is otherwise identical to the valve element 60, prime numerals designate the comparable parts thereof.

Another modified flow control member or plate 72 is shown in FIGS. 25–27 and is sheared from a deck or tray 73 for overlying its vapor orifice 74. Inclined legs 75, similar to the legs 13, integrally connect the plate 72 to the tray 73 and provide openings 76 and apertures 77 which are similar to the openings 14 and apertures 16. The orifice 74 is partially closed by an overlying valve element 78 that is identical to the valve element 60 except for guide legs 64. Instead of being carried by the valve element 78, guide legs or members 79 are made integral with the perimeter of the plate 72 and are sheared from the tray so as to form openings or slots 80 in said tray communicating with its orifice. After installation of the valve element, the legs 79 are bent downwardly into the slots 80 for confining said element against lateral displacement and rotation. If desired, an opening 81 of relatively large size may be formed in the plate 72 to minimize the accumulation of coke and other deposits which might interfere with the full opening movement of the valve element. Since this structure is otherwise identical to that shown in FIGS. 20–22, it functions in the same manner and either may be modified in accordance with the other. Attention is directed to the fact that the supporting legs 75 of the plate 72 are not equally spaced and that the legs 13, 13′ and 26 need not be equally spaced.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A fluid contact tray having a vapor orifice and including a member substantially complementary to and overlying and spaced from the orifice to provide a flow passage between the perimeters of the member and orifice for directing vapor ascending through the orifice laterally through the liquid on the tray, legs depending from and extending outwardly beyond the perimetrical portion of said member so that their outer ends are spaced from said orifice, each of the legs being substantially narrower than said member and coacting with said tray to provide apertures forming vapor passageways which are at substantially right angles to the flow of the vapor through the flow passage, the apertures being located outwardly beyond said orifice between said tray and the margins of said legs, said legs functioning as baffles for directing vapor passing through said apertures laterally through the liquid at an angle to the vapor discharged by the flow passage so as to collide therewith and increase the turbulence of the vapor and liquid to more intimately contact and thoroughly mix the same.

2. A fluid contact tray as set forth in claim 1 wherein the member is sheared from the tray to form the orifice, the legs being sheared from said tray to form openings which underlie said legs and which are substantially narrower than said orifice and communicate therewith and with the apertures, said legs attaching said member to said tray whereby said member and legs are integral with said tray.

3. A fluid contact tray as set forth in claim 1 wherein the margin of the upper surface of the tray surrounding the orifice is substantially flat, the member having a depending undersurface of narrow width adjacent said tray margin and terminating in a sharp edge orifice at the underside of its perimeter and substantially continuous therewith for constricting the area of the flow passage formed by the coaction of said tray orifice and member, the underside of said member adjacent the depending undersurface being substantially parallel to the plane of said tray margin surrounding said orifice whereby said flow passage therebetween is of substantially uniform area, the sharp edge orifice providing a vena contracta and said depending undersurface imparting centripetal force to the vapor to amplify the vena contracta at the vapor-liquid interface for creating a fantail effect which increases the area of said interface and causes extreme turbulence and prolonged contact and thorough mixing of the vapor and liquid.

4. A fluid contact tray as set forth in claim 1 including a metering element loosely confined in overlying spaced relation to the member for upward movement by the pressure of vapor flowing around said member and beneath the element, said member shielding said element from impingement by the vapor, said element having means depending from its perimeter toward the tray for varying the area of the flow passage so as to meter the flow of the vapor upon movement of said element.

5. A fluid contact tray as set forth in claim 4 wherein the margin of the upper surface of the tray surrounding the orifice is substantially flat, the member having a depending undersurface of narrow width adjacent said tray margin and terminating in a sharp edge orifice at the underside of its perimeter and substantially continuous therewith for constricting the area of the flow passage formed by the coaction of said tray orifice and member, the underside of said member adjacent the depending undersurface being substantially parallel to the plane of said tray margin surrounding said orifice whereby said flow passage therebetween is of substantially uniform area, the sharp edge orifice providing a vena contracta and said depending undersurface imparting centripetal force to the vapor to amplify the vena contracta at the vapor-liquid interface for creating a fantail effect which increases the area of said interface and causes extreme turbulence and prolonged contact and thorough mixing of the vapor and liquid.

6. A fluid contact tray as set forth in claim 4 wherein the depending means of the metering element substantially encloses the legs for restricting the flow of vapor through the apertures.

7. A fluid contact tray as set forth in claim 4 wherein the member has an opening to permit a portion of the vapor to impinge the metering element for reducing the metering action thereof.

8. A fluid contact tray as set forth in claim 1 including a metering cap loosely confined in overlying spaced relation to the member for upward movement by the pressure of the vapor flowing around said member and beneath the cap, said member shielding said camp from impingement by the vapor, and a skirt depending from the perimeter of said cap toward the tray for controlling the area of the flow passage so as to vary the flow of the vapor upon movement of said cap.

9. A fluid contact tray as set forth in claim 1 including a valve element overlying the orifice and underlying the member for movement therebetween to control the area of the flow passage, the element being liftable into engagement with said member by the pressure of the vapor below the tray to enlarge the area of said passage.

10. A fluid contact tray as set forth in claim 9 wherein the margin of the upper surface of the tray surrounding the orifice is substantially flat, the element having a depending undersurface of narrow width adjacent said tray margin and terminating in a sharp edge orifice at the underside of its perimeter and substantially continuous therewith for constricting the area of the flow passage, the underside of said element adjacent the depending undersurface being substantially parallel to the plane of said tray margin surrounding said tray orifice whereby said flow passage is of substantially uniform area, the sharp edge orifice providing a vena contracta and said depending undersurface imparting centripetal force to the vapor to amplify the venta contracta at the vapor-liquid interface for creating a fantail effect which increases the area of said interface and causes extreme turbulence and prolonged contact and thorough mixing of the vapor and liquid.

11. A fluid contact tray as set forth in claim 9 wherein the valve element has an opening to permit a portion of the vapor to impinge the member and flow between said member and element so as to create a pressure above said element for resisting lifting thereof.

12. A fluid contact tray as set forth in claim 9 including guide legs extending between the perimeters of the member and valve element for confining the element against lateral displacement.

13. A fluid contact tray as set forth in claim 12 wherein the guide legs are carried by the perimeter of the valve element for engagement with the perimeter of the member.

14. A fluid contact tray as set forth in claim 12 wherein the guide legs are integral with and depend from the perimeter of the member, said guide legs being sheared from the tray to form slots therein communicating with the orifice for receiving the lower ends of said legs.

References Cited in the file of this patent

UNITED STATES PATENTS

| | | |
|---|---|---|
| 2,428,889 | Nutter | Oct. 14, 1947 |
| 2,718,901 | Nutter | Sept. 27, 1955 |
| 2,772,080 | Huggins et al. | Nov. 27, 1956 |
| 2,772,081 | Hibshman et al. | Nov. 27, 1956 |
| 2,959,404 | Eld et al. | Nov. 8, 1960 |
| 2,979,316 | Houston | Apr. 11, 1961 |

FOREIGN PATENTS

| | | |
|---|---|---|
| 595,404 | Germany | Apr. 10, 1934 |
| 690,798 | Great Britain | Apr. 29, 1953 |
| 755,019 | France | Sept. 4, 1933 |
| 1,233,551 | France | May 9, 1960 |
| 1,237,299 | France | June 20, 1960 |